(12) United States Patent
Clark et al.

(10) Patent No.: US 8,055,629 B2
(45) Date of Patent: Nov. 8, 2011

(54) TRANSITIONING AN ARCHIVED FILE TO WRITE-ONCE-READ-MANY

(75) Inventors: Thomas Keith Clark, Tucson, AZ (US);
Bruce Light Hillsberg, San Carlos, CA (US); Wayne Curtis Hineman, San Jose, CA (US); Bernhard Julius Klingenberg, Morgan Hill, CA (US); Robert M. Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/042,533

(22) Filed: Mar. 5, 2008

(65) Prior Publication Data

US 2009/0228529 A1  Sep. 10, 2009

(51) Int. Cl.
*G06F 7/00* (2006.01)
*G06F 17/00* (2006.01)
(52) U.S. Cl. .................................................. 707/665
(58) Field of Classification Search .......... 707/662, 707/665
See application file for complete search history.

(56) References Cited

U.S. PATENT DOCUMENTS

| | | | |
|---|---|---|---|
| 5,819,292 A | 10/1998 | Hitz et al. | |
| 6,081,807 A | 6/2000 | Story et al. | |
| 6,185,661 B1 | 2/2001 | Ofek et al. | |
| 6,816,872 B1 | 11/2004 | Squibb | |
| 6,823,398 B1 * | 11/2004 | Lee et al. | 710/5 |
| 6,833,848 B1 * | 12/2004 | Wolff et al. | 715/719 |
| 7,155,460 B2 * | 12/2006 | McGovern et al. | 1/1 |
| 7,590,807 B2 * | 9/2009 | McGovern et al. | 711/159 |
| 2005/0027757 A1 | 2/2005 | Kiessig et al. | |
| 2006/0136516 A1 | 6/2006 | Jain et al. | |

OTHER PUBLICATIONS

Quinlan, S., "A Cached WORM File System", Software-Practice and Experience, vol. 21, No. 12, Dec. 1991.
Hitachi Data Systems, "Content Archive Platform", http://www.hds.com/products/storage-systems/content-archive-platform/index.html, retrieved Feb. 26, 2008, 3 pages.
A White Paper by IT Centrix, "Hitachi's New Generation Active Archive Platform", http://www.hds.com/assets/pdf/itcentrix-white-paper-on-new-generation-active-archive-platform.pdf, retrieved Feb. 26, 2008, 11 pages.
IDC Product Flash, "HDS Makes Its Next Market Move with Content Archiving", http://www.hds.com/assets/pdf/idc_hcapflash_june2007.pdf, retrieved Feb. 26, 2008, 2 pages.
Hitachi Content Archive Platform "An Active Archive Solution", http://www.hds.com/assets/pdf/content-archive-platform-an-active-archive-solution-br.pdf, retrieved Feb. 26, 2008, 8 pages.

(Continued)

*Primary Examiner* — Greta Robinson
*Assistant Examiner* — Jeffrey Chang
(74) *Attorney, Agent, or Firm* — Feb R Cabrasawan (57) ABSTRACT

Transitioning a data file in an archive system from read-write to write-once-read-many ("WORM") is triggered by a control file rather than using a timeout approach or a overload approach. A storage manager may receive a series of archive instructions to write a data file to an archive. During this time, the archive file may be in a read-write state. The storage manager may receive a control file, which may be structured, such as an XML file. Receipt of the control file signals to an storage manager archive system that the data file has been written to the archive and triggers the storage manager to make the data file immutable by switching it from read-write state to WORM state.

21 Claims, 7 Drawing Sheets

OTHER PUBLICATIONS

Archivas Digital Archiving, "The Open Archive, Enabling Discovery", http://www.archivas.com:8080/product_info/z3_pdfs_gh23/OpenArchive.pps, retrieved Feb. 26, 2008, 23 pages.

Archivas Digital Archiving, "Preserving the Last Copy", http://www.archivas.com:8080/product_info/z3_pdfs_gh23/Archivas_Preserving_Last_Copy.pdf, retrieved Feb. 26, 2008, 18 pages.

* cited by examiner

TRANSITIONING AN ARCHIVED FILE TO WRITE-ONCE-READ-MANY

BACKGROUND OF THE INVENTION

1. Field of the Invention

This invention relates to computer archive software. Particularly, this invention relates to computer archive software that stores immutable data objects such as Write-Once-Read-Many ("WORM") files.

2. Description of the Related Art

Computer archive software stores data objects, such as files, in order to preserve them for a period of time. The files in the archive are required to be immutable—after the file is completely written, it is not allowed to be changed. Determining when a file has been completely written is problematic. Protocols for sending data to the archive system (such as NFS) do not provide an open/close semantic, making it impossible to simply declare the object to be immutable at close.

Prior archive systems rely on timeout approaches or overload approaches to determine when a file is completely written and can therefore be changed to be immutable. Using a timeout approach, an archive system waits a certain period of time (such as 30 or 60 seconds) following the last write to the object before declaring the object immutable. Such a timeout approach works but is subject to failures. For example, a network outage or application pause may cause the timeout period to pass without the application having finished writing the file. When the timeout period passes, an archive system using the timeout approach will transition the file to immutable. A failure will occur when the application sends a subsequent write. Such an error forces the archive system to create a new object and to start over.

Other archive systems use an overload approach. With this technique, following completion of the writing of an object to the archive, an update to a file attribute signals the archive system to treat the file as immutable. U.S. Pat. No. 7,155,460 by McGovern et al. discloses an overload approach in which "the client calls up the file properties dialog and sets the read-only attribute for the WORM file on drive W. The file server's file system recognizes the transition of the file from not-read-only to read-only state and thenceforth designates the file as WORM and all the above restrictions or modification, changes in attribute, etc. are enforced. Significantly, any subsequent attempt by the client to modify the read-only state of the file is denied, and a permission denied message is returned to the client from the file server" (col. 13, lines 29-40). The overload approach requires modification to the application to enable it to overload the file attribute in the agreed-upon fashion to indicate that the file should be transitioned to WORM.

SUMMARY OF THE INVENTION

A typical embodiment of the invention comprises a method for making a data object (such as a data file) immutable by receiving at least one archive instruction to write the data object to an archive, and receiving a control object only after the data object has been completely written to the archive. In such an embodiment, the control object includes an indicator that the data object should be immutable. Receipt of the control objects signals that the data object has been completely written to the archive. Receipt of the control object also triggers an archive system or other file manager to make the data object immutable by switching it from read-write to write-one-read-many (WORM).

In one embodiment, the data object is a file. In one embodiment, the control object is an XML file. In one embodiment, the control object comprises a plurality of metadata corresponding to the data object. In one embodiment, this metadata provides retention information for the data object in the archive. In another embodiment, this metadata provides availability requirements for the data object in the archive. In yet another embodiment, this metadata provides remote copy requirements for the data object in the archive.

BRIEF DESCRIPTION OF THE DRAWINGS

Referring now to the drawings in which like reference numbers represent corresponding parts throughout.

DETAILED DESCRIPTION OF THE PREFERRED EMBODIMENT

A storage manager, such as the Tivoli Storage Manager ("TSM") product marketed by IBM Corporation, may be used for securely archiving and backing up data. The storage manager may execute in a storage management server (such as a TSM server).

The TSM may provide data storage services to clients (such as TSM clients), for backing up, archiving, or otherwise managing data objects, such as data files. Data objects that are sent to the TSM server by one or more TSM clients may be stored by the TSM in a storage repository.

Figure 1:
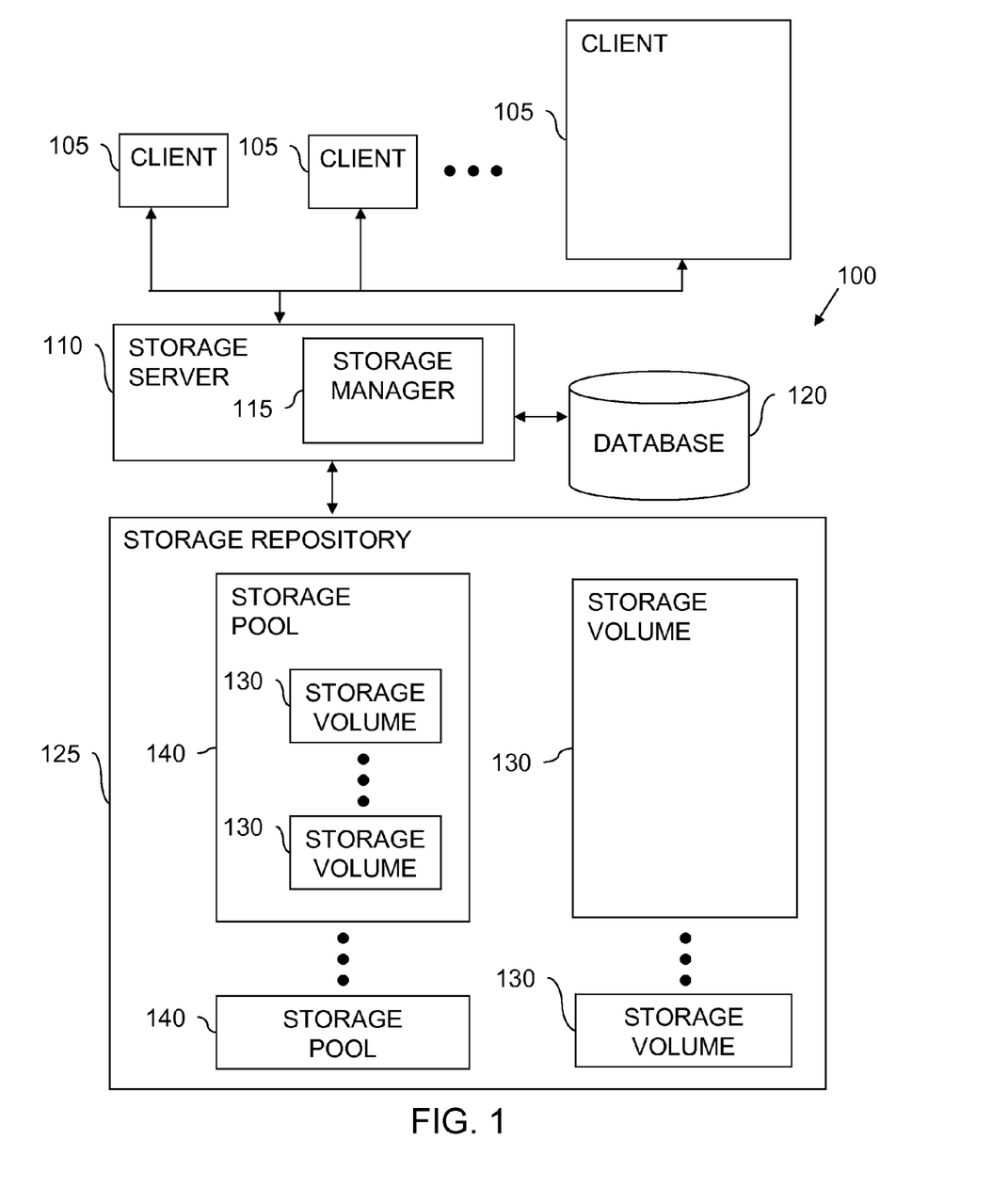
FIG. 1 is a block diagram of a series of clients, a storage server and a storage repository.

FIG. 1 illustrates a set of clients 105 connected to a storage management system 100 made up of one or more storage servers, one or more databases and a storage repository. A storage management server 110 includes a processor and a memory, such as random access memory (RAM), upon which is stored the storage manager software 115, such as TSM. The storage management server 110 preferably is in communication with a database 120, which may be employed to maintain information on the properties, metadata and transactions (e.g. storage location, expiration, state, logical delete, secure delete, write, etc.) of the data objects in the storage management system.

Through the storage management server 110, the storage manager 115 may manage the backing up or archiving of data objects from one or more clients 105 to a storage repository 125. In some embodiments, the storage repository 125 consists of one or more logical or physical storage volumes 130, such as disks and tapes, some of which may be arranged as one or more logical storage pools 140. Once data objects are stored in a storage volume 130, they may be copied or relocated to other storage volumes in the storage repository 125. The storage repository 125 is not limited to disks and tapes but can include other storage media. In certain embodiments, tapes may be emulated by storing data on one or more disks and writing the data in a logically sequential manner as part of a virtual tape library.

The clients 105, storage server 110, database 120 and storage repository 125 may communicate directly or via any suitable network, such as, a storage area network (SAN), a local area network (LAN), an Intranet, the Internet, etc. The clients 105 may include a TSM client that archives, backs up and restores data to and from the storage server 110. The clients 105 may also include a TSM administrative client that may control the storage manager 115 and may monitor operations performed by the storage server 110. The TSM administrative client may be capable of issuing commands for the purpose of configuring and driving operations on the storage server 110. In some embodiments, the TSM administrative client may also monitor the state of the storage server 110 and may determine whether the storage server 110 is operating properly.

One skilled in the art will recognize that the elements of FIG. 1 can be enabled in yet other fashions. For example, while FIG. 1 shows a client-server architecture, the invention is operable on other architectures. For example, movement of the data file 210 and control file 220 to a storage repository could all take place within a single appliance, and the components could communicate directly to one another rather than over a LAN or other network. In another embodiment, the database 120 could be configured as a content management system, a file system that stores metadata, or some other metadata store. Thus, FIG. 1 is used in this discussion to demonstrate a preferred way of implementing the invention, but it is not the only way the invention can be implemented.

Figure 2:
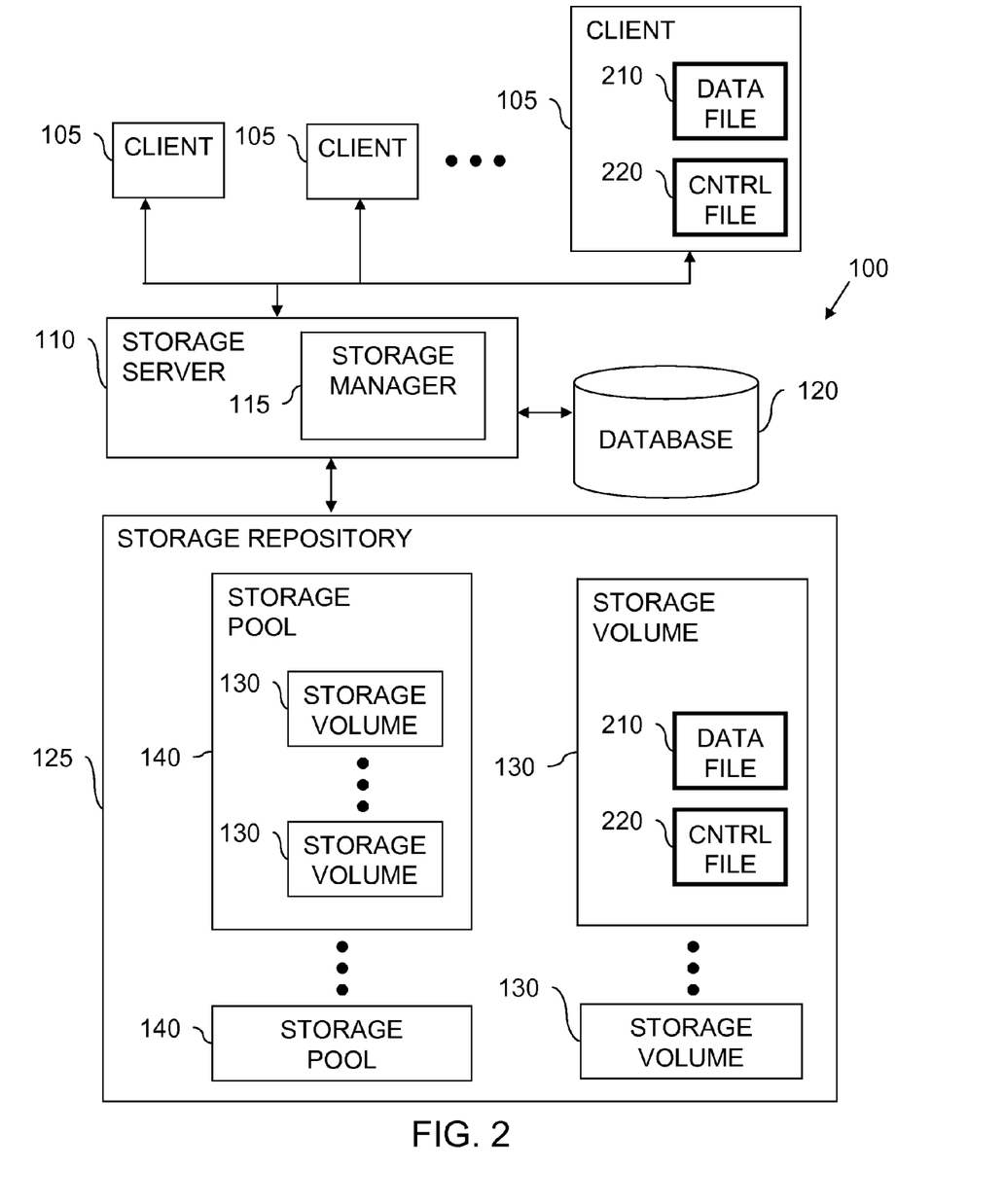
FIG. 2 is the block diagram of FIG. 1, also showing a data object and corresponding control object.

FIG. 2 illustrates a logical view of an embodiment of the present invention. One of the clients 105 has a data object (such as a file) 210 for archival by the storage manager 115 in the storage repository 125. The client 105 may send this data file 210 to the storage manager 115 over a set of APIs that include file interfaces. Such a data file is typically written to the storage manager 115 in a series of operations, each of which may contain an open/write/close sequence. During the process of writing the data object to the archive, the object must remain writeable. This state is referred to as the read-write state. After the object is completely written to the archive system, it must then become immutable, with the archive system (i.e., storage manager) preventing further writes to the object. The state of the object has effectively transitioned to WORM (write-once-read-many).

As discussed above, prior art systems rely on timeout or overload approaches. Unfortunately both approaches have disadvantages. In an embodiment of the present invention illustrated in FIG. 2, these disadvantages are overcome by the use of a control object (such as a control file) 220. The control file may be in a structured format, such as XML, or other format agreed upon by the components of the system. The control file is written to the storage server only after the data file it refers to has been completely written to the archive. The completion of the control file 220 (or other indicator within the control file) signals the archive system (such as TSM 115) to make the data file immutable. The control file can contain useful information for the archive system, such as how to treat the corresponding data file in the archive, such as how long to retain the file, how many copies to make for availability purposes, whether to index the file, and other information useful to the management of the primary file in the archive. Because it contains additional metadata for the file, the control file provides additional information to be included in the archive's index for later search and retrieval based on metadata attributes.

In order for the embodiment of the invention to correctly mark files immutable, the storage manager 115 must be able to: (A) determine when the data file 210 has been completely written to the archive system; and (B) associate the control file with the primary data file 210. In order to determine when the data 210 has been completely written, when the archive system sees the end of the structured control file, it is able to mark the associated primary file as immutable.

In one embodiment, the XML format for the control file 220 can be quite simple, such as:

```
<?xml version="1.0"?>
<controlfile>
    ... control information for the file ...
</controlfile>
```

In such an embodiment, when the archive system receives the end of the XML control file, signified by the closing tag "</controlfile>" in the XML file, it is able to mark the associated primary data file as immutable. In other embodiments, the control file may use another indicator. For example, a single control file may signal that a series of data files are ready to be made immutable. By leveraging such a control file, the invention provides a discreet and predictable method for marking a file as immutable in the archive.

Some prior art archive systems also use XML files to hold metadata about a data file. However, the metadata in prior art systems is used for indexing. The prior art does not teach a system in which the metadata or the XML file itself is used to trigger the transitioning of an archived data file from read-write to immutable WORM.

Figure 3:
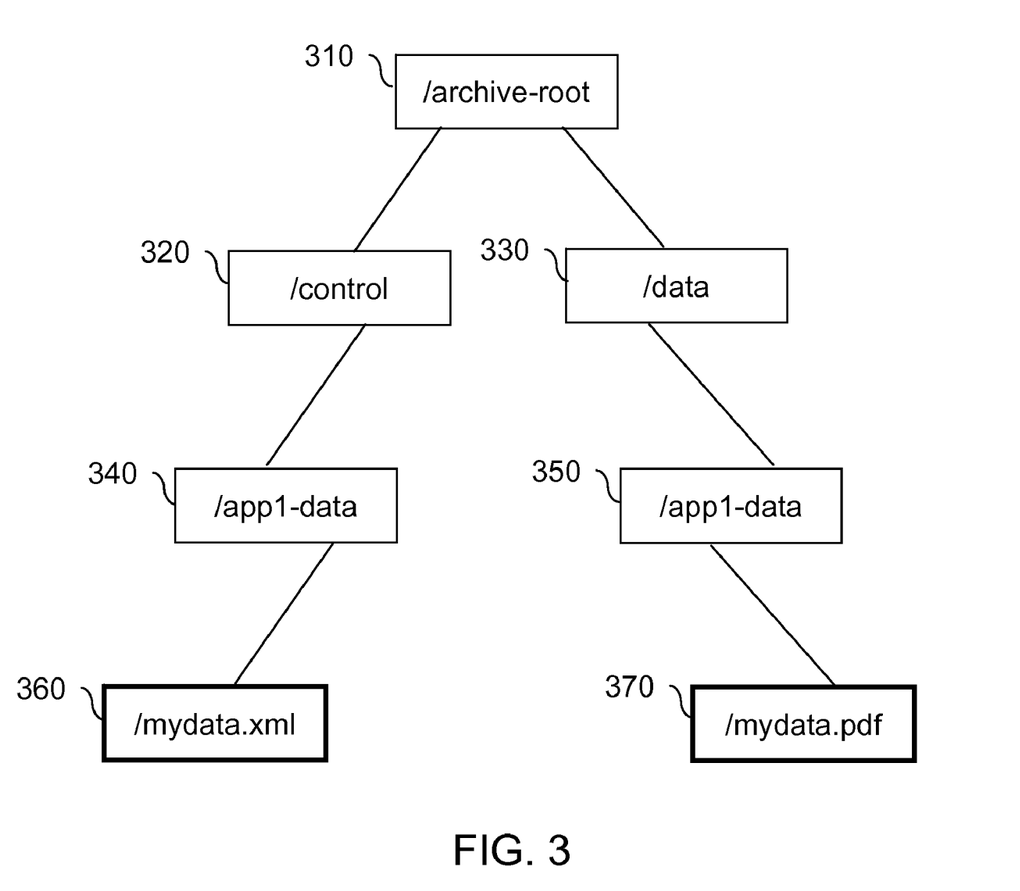
FIG. 3 is a block diagram of a structured file tree for data objets and a mirror file tree for corresponding control objects.
Figure 4:
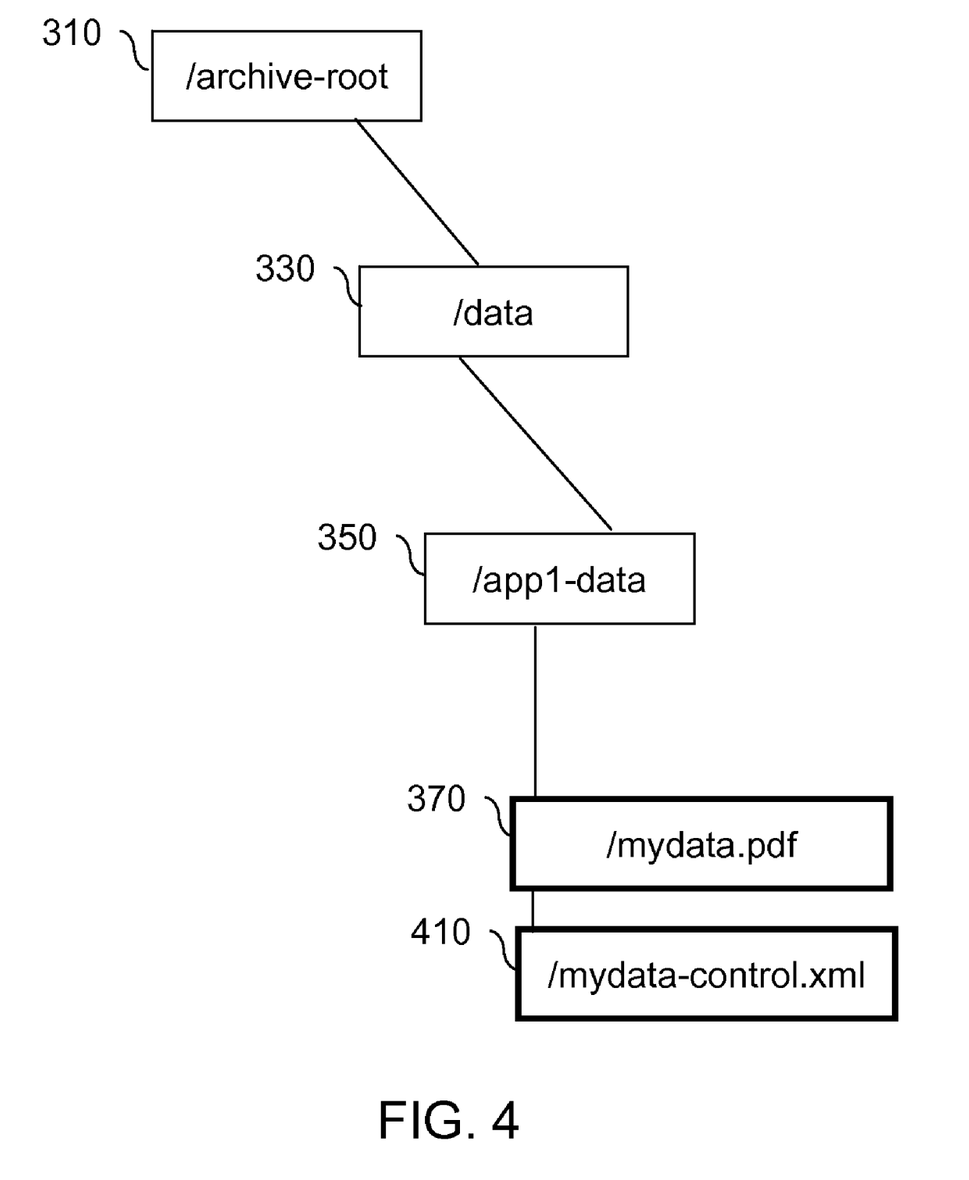
FIG. 4 is a block diagram of a structured file tree for both data objects and corresponding control objects.
Figure 5:
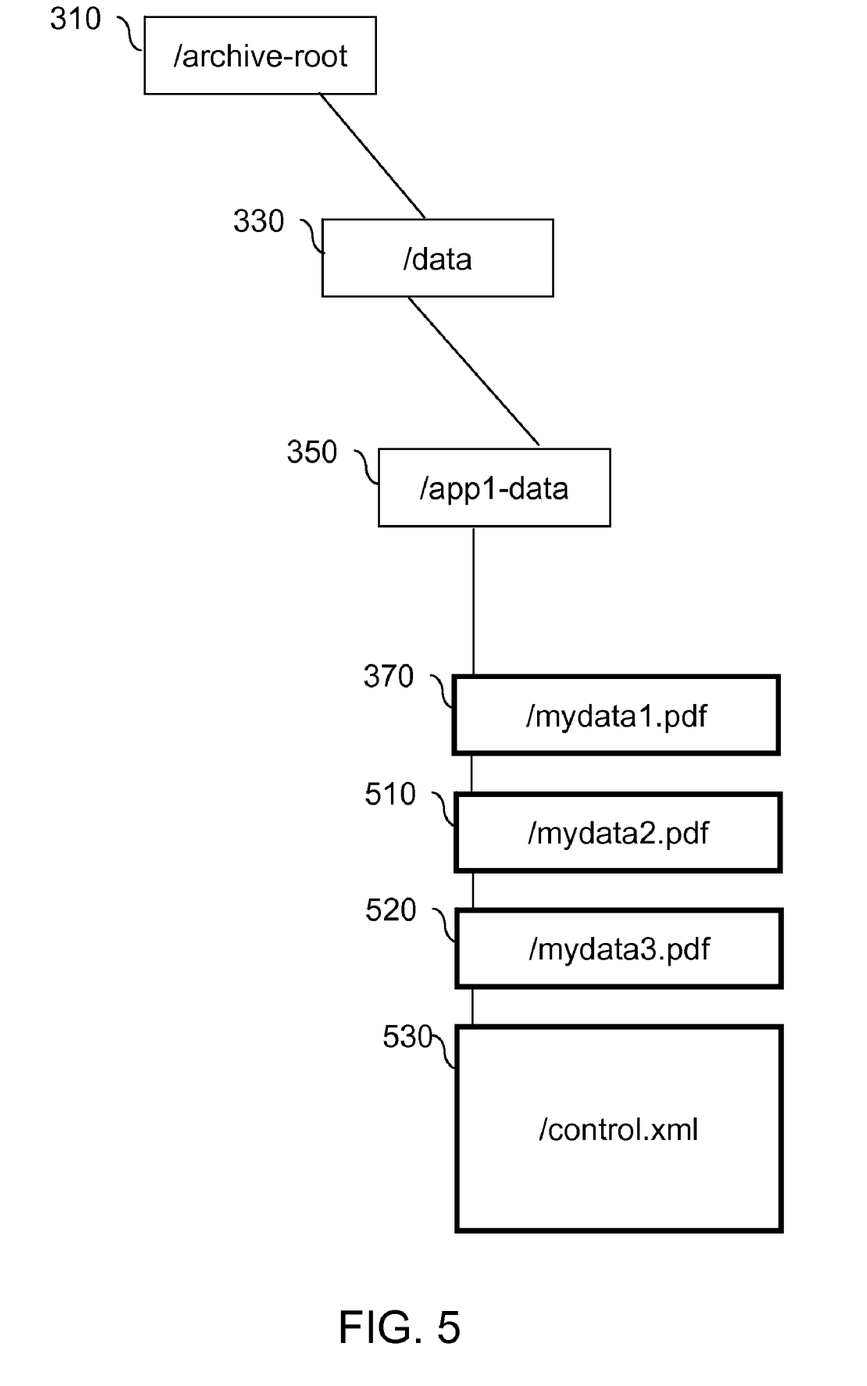
FIG. 5 is a block diagram of a structured file tree where a control object may be the trigger for more than one data object.

There are various techniques available to associate the control file 220 with the primary data file 210. In one embodiment, a known correspondence in the namespace is maintained between the control file and the primary data file. For example, the control file can be a file in the archive namespace which corresponds to the primary file, either in the same directory as the primary file or in a special namespace for control files. Three various approaches for associating the control file with the primary data file are illustrated in FIGS. 3, 4 and 5. The approach shown in FIG. 3 stores the data files in a structured directory tree and the corresponding control files in a mirror directory tree. In this approach, the same directory structure is available below both the "control" root directory 320 and "data" root directory 330. The data files are placed in the data root directory 330 and the corresponding control files of the same name (although with different extensions) are placed in the corresponding directory in the control file tree. For example, FIG. 3 shows the mydata.pdf data file 370 and its corresponding mydata.xml control file 360.

FIG. 4 shows a second approach, in which the corresponding control file is found in the same directory as the data file itself. Here, the mydata.pdf data file 370 has a corresponding control file 410 that is given a "-control" extension to the base file name to distinguish the control file from the primary file. In this case, the data file is named "mydata.pdf" and its control file is named "mydata-control.xml".

Yet another embodiment is shown in FIG. 5. Here, a single control file 530 provides the metadata for three data files 370, 510 and 520. After all three data files 370, 510 and 520 are written to the archive, the control file 530 is sent to the storage manager and all three data files 370, 510 and 520 are then transitioned to WORM.

Figure 6:
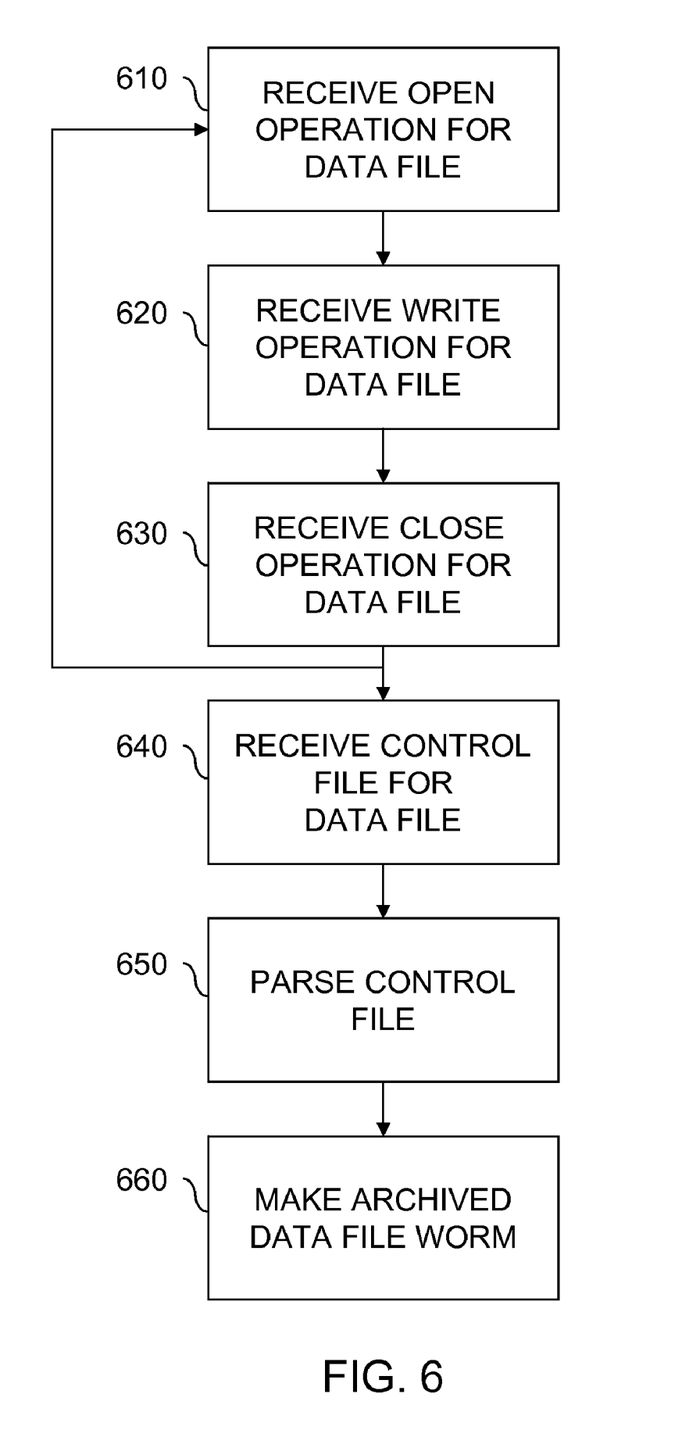
FIG. 6 is a flowchart of exemplary steps of a algorithm/method embodiment of the invention.

The general method of one embodiment of the invention is shown in the flowchart of FIG. 6. Here, at step 610 a storage manager or other archive manager may receive an open operation by the client for a particular data file. At step 620, the storage manager may receive a write operation for the data file, followed by a close operation at step 630. Steps 610, 620 and 630 may be repeated numerous times as additional portions of the data file are sent from the client to the storage manager. At some point, step 640 may occur when the storage manager receives a control file. At step 650, the storage manager may parse the control file. Such a control file is not sent until after the data file is completely written to the archive. When the control file is parsed and the end of a control tag (or other indicator) is reached, then at step 660, the storage manager may instruct the storage repository to transition the archived copy of the data file from read-write to WORM, making the archived data file immutable.

Additional Embodiment Details

The described techniques may be implemented as a method, system, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The above discussion and the figures illustrate the invention's use with the TSM storage manager software. One skilled in the art will recognize that the invention may be implemented with other storage managers or archive systems.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
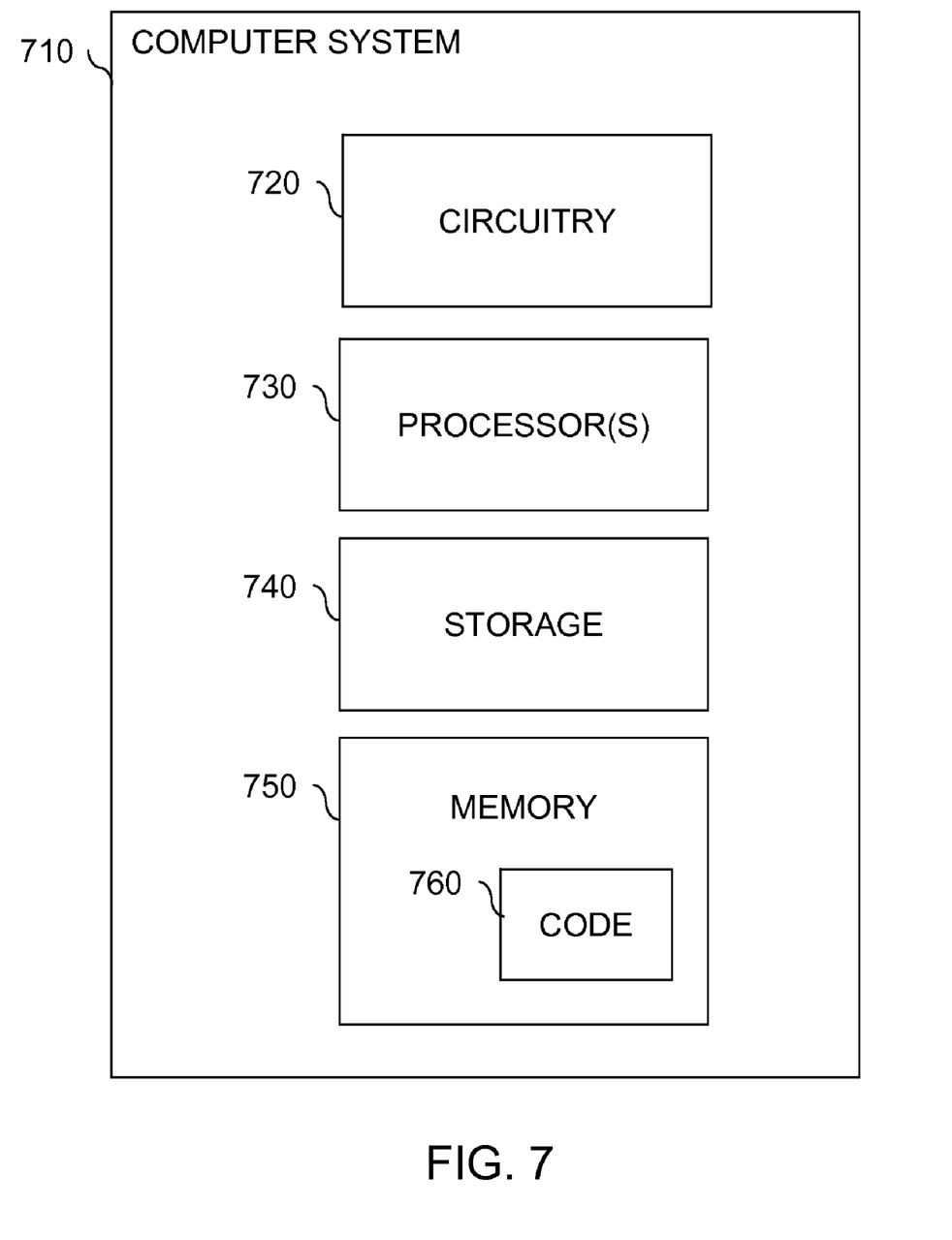
FIG. 7 illustrates an exemplary computer system that can be used to implement embodiments of the present invention.

FIG. 7 illustrates the architecture of a computer system 710, wherein certain embodiments the clients 105, storage server 110, storage volumes 130, etc. of the figures may be implemented. The computing system 710 may also be referred to as a system, and may include circuitry 720 that may in certain embodiments include one or more processors 730. The system 710 may also include storage 740 and memory 750 (e.g., a volatile memory device). The storage 740 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 740 may comprise an internal storage device, an attached storage device and/or a network accessible storage device. The system 710 may include program logic code 760 that may be loaded into the memory 750 and executed by the processor 730 or circuitry 720. In certain embodiments, the program logic code 760 may be stored in the storage 740. In certain other embodiments, the program logic code 760 may be implemented in the circuitry 720. In certain embodiments, the computer system may include an instruction receiver and a control receiver. In certain embodiments, a single receiver may act as both the instruction receiver and the control receiver.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed. Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures are described as having specific types of information. In alternative embodiments, the data structures and components may be structured differently and have fewer, more or different fields or different functions than those shown or referred to in the figures.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A method for making a data object stored in an archive immutable, comprising:
    receiving at least one first archive instruction to write the data object to an archive;
    writing the data object to the archive, responsive to receiving the at least one first archive instruction;
    receiving a second archive instruction to write a control file to the archive, only after the data object has been completely written to the archive, the control file being a different file than the data object;
    responsive to receiving the second archive instruction,
        determining whether the control file corresponds to an instruction that the data object should be rendered immutable;
        responsive to determining that the control file corresponds to the instruction that the data object should be rendered immutable,
            rendering the data object immutable within the archive,
    wherein receipt of the control file signals that the data object has been completely written to the archive, such that no further data of the data object is to be received for writing to the archive,
    and wherein prior to receipt of the control file, it is not known whether the data object is to be rendered immutable within the archive, both before and after the data object has been completely written to the archive.

2. The method from claim 1, wherein the data object is a file.

3. The method from claim 1, wherein the control file is an XML file.

4. The method from claim 1, wherein the control file includes a plurality of metadata corresponding to the data object.

5. The method from claim 4, wherein at least one of the plurality of metadata in the control object file provides retention information for the data object in the archive.

6. The method from claim 4, where at least one of the plurality of metadata in the control file provides availability requirements for the data object in the archive.

7. The method from claim 4, where at least one of the plurality of metadata in the control file provides remote copy requirements for the data object in the archive.

8. A system for making a data object stored in an archive immutable, comprising:
    an instruction receiver for receiving at least one first archive instruction to write the data object to an archive, such that responsive to receipt of the least one first archive instruction, the data object is written to the archive; and
    a control receiver for receiving a second archive instruction to write a control file to the archive, only after the data object has been written to the archive, such that responsive to receipt of the second archive instruction the control receiver is to determine whether the control file corresponds to an instruction that the data object should be rendered immutable, and responsive to determination that the control file corresponds to the instruction that the data object should be rendered immutable, the data object is rendered immutable within the archive,
    wherein receipt of the control file signals that the data object has been completely written to the archive, such that no further data of the data object is to be received for writing to the archive
    and wherein prior to receipt of the control file it is not known whether the data object is to be rendered immutable within the archive, both before and after the data object has been completely written to the archive.

9. The system from claim 8, wherein the data object is a file.

10. The system from claim 8, wherein the control file is an XML file.

11. The system from claim 8, wherein the control file includes a plurality of metadata corresponding to the data object.

12. The system from claim 11, wherein at least one of the plurality of metadata in the control file provides retention information for the data object in the archive.

13. The system from claim 11, where at least one of the plurality of metadata in the control file provides availability requirements for the data object in the archive.

14. The system from claim 11, where at least one of the plurality of metadata in the control file provides remote copy requirements for the data object in the archive.

15. A computer program product for making a data object stored in an archive immutable, the computer program product comprising a computer useable medium having a computer readable program, wherein the computer readable program, when executed on a computer, causes the computer to perform a method comprising:

receiving at least one first archive instruction to write the data object to an archive;

writing the data object to the archive responsive to receiving the at least one first archive instruction;

receiving a second archive instruction to write a control file to the archive, only after the data object has been completely written to the archive;

responsive to receiving the second archive instruction, determining whether the control file corresponds to an instruction that the data object should be rendered immutable;

responsive to determining that the control file corresponds to the instruction that the data object should be rendered immutable, rendering the data object immutable within the archive, wherein receipt of the control file signals that the data object has been completely written to the archive, such that no further data of the data object is to be received for writing to the archive, and wherein prior to receipt of the control file it is not known whether the data object is to be rendered immutable within the archive, both before and after the data object has been completely written to the archive.

16. The computer program product from claim 15, wherein the data object is a file.

17. The computer program product from claim 15, wherein the control file is an XML file.

18. The computer program product from claim 15, wherein the control file includes a plurality of metadata corresponding to the data object.

19. The computer program product from claim 18, wherein at least one of the plurality of metadata in the control provides retention information for the data object in the archive.

20. The computer program product from claim 18, where at least one of the plurality of metadata in the control file provides availability requirements for the data object in the archive.

21. The computer program product from claim 15, where at least one of the plurality of metadata in the control file provides remote copy requirements for the data object in the archive.

* * * * *